United States Patent

Chen

(10) Patent No.: US 10,726,057 B2
(45) Date of Patent: Jul. 28, 2020

(54) METHOD AND DEVICE FOR CLARIFYING QUESTIONS ON DEEP QUESTION AND ANSWER

(71) Applicant: BEIJING BAIDU NETCOM SCIENCE AND TECHNOLOGY CO., LTD., Beijing (CN)

(72) Inventor: Yanfeng Chen, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 320 days.

(21) Appl. No.: 15/832,839

(22) Filed: Dec. 6, 2017

(65) Prior Publication Data

US 2018/0181648 A1    Jun. 28, 2018

(30) Foreign Application Priority Data

Dec. 27, 2016 (CN) .......................... 2016 1 1226792

(51) Int. Cl.
*G06F 16/332* (2019.01)
*G06F 16/35* (2019.01)
(Continued)

(52) U.S. Cl.
CPC ........ *G06F 16/3329* (2019.01); *G06F 16/338* (2019.01); *G06F 16/35* (2019.01); *G06F 16/9027* (2019.01); *G06F 16/951* (2019.01)

(58) Field of Classification Search
CPC ............. G06F 16/3329; G06F 16/9027; G06F 16/951; G06F 16/338; G06F 16/35
See application file for complete search history.

(56) References Cited

U.S. PATENT DOCUMENTS 8,473,486 B2 * 6/2013 He .................... G06F 16/951
                                                       707/722
8,583,670 B2 * 11/2013 Cameron ........... G06F 16/3322
                                                       707/765

(Continued)

FOREIGN PATENT DOCUMENTS

CN    104123351    10/2014
CN    105868255    8/2016

OTHER PUBLICATIONS

Zheng Yu, Haixun Wang, Xuemin Lin, Min Wang, Learning Term Embeddings for Hypernymy Identification, Jul. 25, 2015, AAAI Press, 24th, 1390-1391 (Year: 2015).*

(Continued)

*Primary Examiner* — William Spieler
(74) *Attorney, Agent, or Firm* — Hodgson Russ LLP

(57) ABSTRACT

The present disclosure discloses a method and a device for clarifying questions based on deep question and answer. The method includes: receiving a query sentence; recalling corresponding answer titles and/or history query sentences according to the query sentence; analyzing the answer titles and/or the history query sentences to obtain corresponding dependency trees; clustering the answer titles and/or the history query sentences according to the dependency trees, to generate at least one cluster of questions; generalizing the at least one cluster of questions to generate candidate and clarified questions; and displaying the candidate and clarified questions.

17 Claims, 6 Drawing Sheets

(51) Int. Cl.
*G06F 16/338* (2019.01)
*G06F 16/951* (2019.01)
*G06F 16/901* (2019.01)

(56) References Cited

U.S. PATENT DOCUMENTS

| | | | | |
|---|---|---|---|---|
| 9,508,104 | B2* | 11/2016 | Pal | G06Q 50/01 |
| 2007/0073533 | A1* | 3/2007 | Thione | G06F 17/279 |
| | | | | 704/9 |
| 2013/0013291 | A1* | 1/2013 | Bullock | G06F 40/30 |
| | | | | 704/9 |
| 2014/0006012 | A1* | 1/2014 | Zhou | G06F 16/3329 |
| | | | | 704/9 |
| 2016/0203130 | A1* | 7/2016 | Roque | G06F 16/93 |
| | | | | 707/741 |
| 2017/0017897 | A1* | 1/2017 | Bugay | G06F 40/18 |

OTHER PUBLICATIONS

Gao et al., "Research on Text Clustering Based on Dependency Treebank," Journal of Chinese Information Processing, vol. 25, No. 3, May 2011, pp. 59-63.
SIPO, First Office Action for CN Application No. 201611226792.X, dated Oct. 14, 2019.

* cited by examiner

Webpage  Map  Tieba application  More

How to treat diabetes    Search

| Group? | old man | pregnant woman | teenagers |
|---|---|---|---|
| Period? | early period | terminal period | |

The best treatment for diabetes _ experience

1. Diet therapy, which is the basis for the treatment of diabetes, because diabetes is related to the ...
2. Exercise therapy, the statement is that exercise, proper exercise is conducive to increase the ...
3. Diabetes education, only know some knowledge of diabetes, in order to better control diabetes experience                                              more How to treat diabetes Four kinds of food clever treatment of diabetes
Xunyiwenyao-2010-06-13

Fig. 3

Webpage    Map    Tieba    Application    More

What medicine to take when catching an anemopyretic cold

Are you looking for it:
What medicine to take when a baby catches an anemopyretic cold?   What medicine to take when a pregnant woman catches an anemopyretic cold?
What medicine to take when the old man catches an anemopyretic cold?   What medicine to take when an adult catches an anemopyretic cold?

The difference between anemopyretic cold and anemofrigid cold ___Teng cattle health network April 20, 2016, afraid of the cold, the head hurts. Because constipation can cause the wind to heat a cold, the beginning of the sore throat, afterwards fever, thirst, need to eat a few medicine of cure of heat and detoxification

 295 comments

What medicine to take when the baby catches an anemopyretic cold 5 answers - question time: October 18, 2011

I had a cold, sore throat, a little fever, no appetite, lethargy and no spirit

Fig. 5

METHOD AND DEVICE FOR CLARIFYING QUESTIONS ON DEEP QUESTION AND ANSWER

This application is based on and claims priority to Chinese Patent Application No. 201611226792.X, filed on Dec. 27, 2016, the entire contents of which are incorporated herein by reference.

FIELD

The present disclosure relates to an information retrieval technology field, and more particularly to a method and a device for clarifying questions based on deep question and answer.

BACKGROUND

Deep question and answer means a technology which can understand languages of human, intelligently identify meaning of a question, and extract an answer to the question from a huge number of internet data.

When a user searches for information using a search engine, the user can obtain abundant internet resources. However, when intention of a query input by the user is ambiguous, results returned by the search engine in the related art are mixed with many contents that are not relevant to the user's intention in most cases. For example, if a user inputs "symptoms of diabetes" to the search engine, the user wishes to acquire early symptoms of diabetes for early warning. However, there are many contents about "middle symptoms and terminal symptoms of diabetes" in the search results. It can be seen that, most contents of the search results do not exactly match contents that the user wishes to search for, because it cannot be determined which period or which group of diabetes symptoms that the user wishes to acquire according to the query input by the user. Thus, the user has to click plentiful webpages to find contents of interest, or even needs to re-search, reducing retrieval efficiency.

SUMMARY

Embodiments of the present disclosure seek to solve at least one of the problems existing in the related art to at least some extent.

Embodiments of a first aspect of the present disclosure provide a method for clarifying questions based on deep question and answer, including: receiving a query sentence; recalling corresponding answer titles and/or history query sentences according to the query sentence; analyzing the answer titles and/or the history query sentences to obtain corresponding dependency trees; clustering the answer titles and/or the history query sentences according to the dependency trees, to generate at least one cluster of questions; generalizing the at least one cluster of questions to generate candidate and clarified questions; and displaying the candidate and clarified questions.

Embodiments of a second aspect of the present disclosure provide a device for clarifying questions based on deep question and answer, including: a receiving module, configured to receive a query sentence; a recalling module, configured to recall corresponding answer titles and/or history query sentences according to the query sentence; an analyzing module, configured to analyze the answer titles and/or the history query sentences to obtain corresponding dependency trees; a clustering module, configured to cluster the answer titles and/or the history query sentences according to the dependency trees, to generate at least one cluster of questions; a generating module, configured to generalize the at least one cluster of questions to generate candidate and clarified questions; and a displaying module, configured to display the candidate and clarified questions.

Embodiments of a third aspect of the present disclosure provide a terminal, including: a processor and a memory configured to store instructions executable by the processor, wherein the processor is configured to execute following actions: receiving a query sentence; recalling corresponding answer titles and/or history query sentences according to the query sentence; analyzing the answer titles and/or the history query sentences to obtain corresponding dependency trees; clustering the answer titles and/or the history query sentences according to the dependency trees, to generate at least one cluster of questions; generalizing the at least one cluster of questions to generate candidate and clarified questions; and displaying the candidate and clarified questions.

Embodiments of a forth aspect of the present disclosure provide a non-transitory computer-readable storage medium, configured to store one or more programs that, when executed by a processor of a mobile terminal, cause the mobile terminal to perform a method for clarifying questions based on deep question and answer, the method including: receiving a query sentence; recalling corresponding answer titles and/or history query sentences according to the query sentence; analyzing the answer titles and/or the history query sentences to obtain corresponding dependency trees; clustering the answer titles and/or the history query sentences according to the dependency trees, to generate at least one cluster of questions; generalizing the at least one cluster of questions to generate candidate and clarified questions; and displaying the candidate and clarified questions.

Embodiments of a fifth objective of the present disclosure provide a program product. When instructions in the program product are executed by a processor, the processors is configured to execute a method for clarifying questions based on deep question and answer, the method including: receiving a query sentence; recalling corresponding answer titles and/or history query sentences according to the query sentence; analyzing the answer titles and/or the history query sentences to obtain corresponding dependency trees; clustering the answer titles and/or the history query sentences according to the dependency trees, to generate at least one cluster of questions; generalizing the at least one cluster of questions to generate candidate and clarified questions; and displaying the candidate and clarified questions.

With the present disclosure, by clustering and generalizing the recalled answer titles and history query sentences related to the query sentence, candidate and clarified questions are generated and displayed to the user, such that the user can obtain more exact search results according to the candidate clarified questions, improving search efficiency.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 3 is a schematic diagram showing an effect of directly displaying a plurality of clarifying dimensions of a core word according to an embodiment of the present disclosure;

FIG. 5 is a second schematic diagram showing an effect of displaying one clarifying dimension of a core word each time according to an embodiment of the present disclosure;

DETAILED DESCRIPTION

Figure 1:
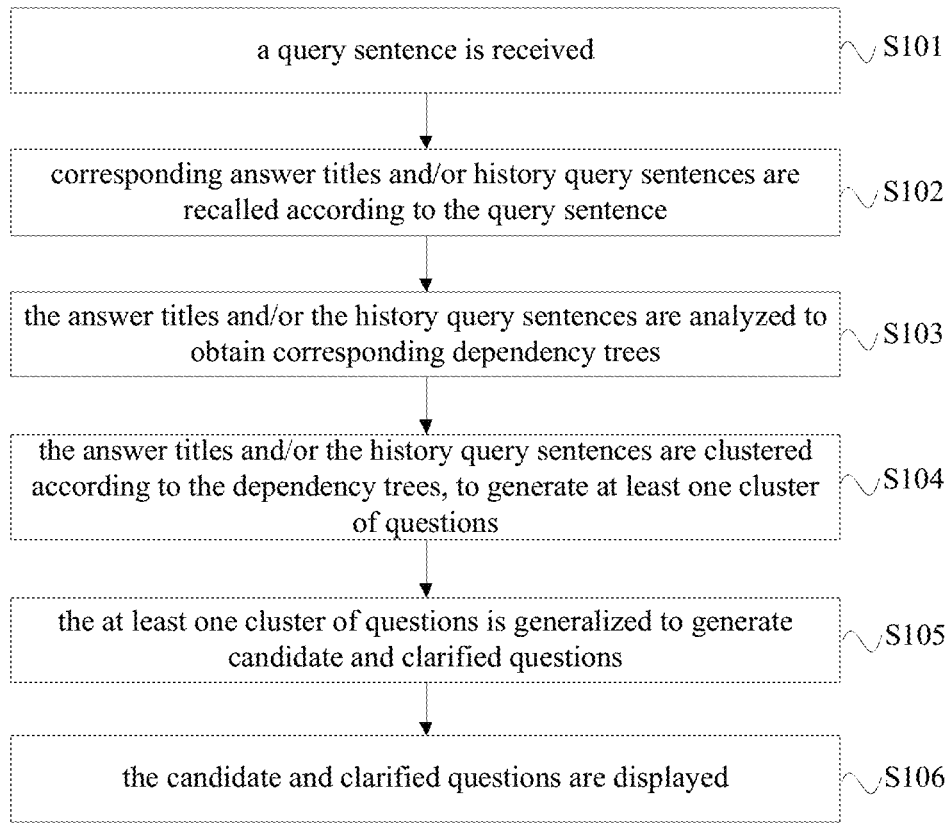
FIG. 1 is a flow chart of a method for clarifying questions based on deep question and answer according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The method and the device for clarifying questions based on deep question and answer according to embodiments of the present disclosure will be described below with reference to drawings.

When a user searches for information using a search engine, search results may be mixed with some contents that the user does not want if intention of a query input by the user is ambiguous. The user has to click plentiful webpages to find contents of interest, which reduces retrieval efficiency. For this problem, a question of the user can be clarified by guiding the user with question-and-answer clarification, and thus the user can obtain more targeted answers. For this, the present disclosure provides a method for clarifying questions based on deep question and answer, including: receiving a query sentence; recalling corresponding answer titles and/or history query sentences according to the query sentence; analyzing the answer titles and/or the history query sentences to obtain corresponding dependency trees; clustering the answer titles and/or the history query sentences according to the dependency trees, to generate at least one cluster of questions; generalizing the at least one cluster of questions to generate candidate and clarified questions; and displaying the candidate and clarified questions.

FIG. 1 is a flow chart of a method for clarifying questions based on deep question and answer according to an embodiment of the present disclosure.

As shown in FIG. 1, the method for clarifying questions based on deep question and answer includes followings.

In block S101, a query sentence is received.

For example, when a user wants to obtain a method for treating a cold, the user can input a query sentence "How to do if has got a cold" in an input box of a search engine. The search engine receives the query sentence input by the user, and searches according to the query sentence.

In block S102, corresponding answer titles and/or history query sentences are recalled according to the query sentence.

After the query sentence input by the user is received, corresponding answer titles in pages related to the query sentence can be searched for using a search engine, or history query sentences related to the query sentence can be obtained using an inverted index search, such that the answer titles and history query sentences related to the query sentence are recalled from search logs or search results.

For example, the search engine can recall answer titles related to the query sentence "How to do if has got a cold", such as "symptoms and treatments of a cold", "cure a cold quickly", and the like. Alternatively, the inverted index search can be used to obtain history query sentences related to the query sentence from the search logs, such as "How to do if the baby has a cold", "How to do if a pregnant woman has a cold", "How to cure a cold quickly", "How to do if someone has a cold", and the like.

In block S103, the answer titles and/or the history query sentences are analyzed to obtain corresponding dependency trees.

After the answer titles and the history query sentences are recalled according to the query sentence using the search engine or the inverted index search, part of speech of words and dependency relationships between the words in the query sentence, the answer titles and the history query sentences are analyzed, to obtain corresponding dependency trees, such that the dependency relationships in the sentences can be represented by the dependency trees.

Figure 2A:
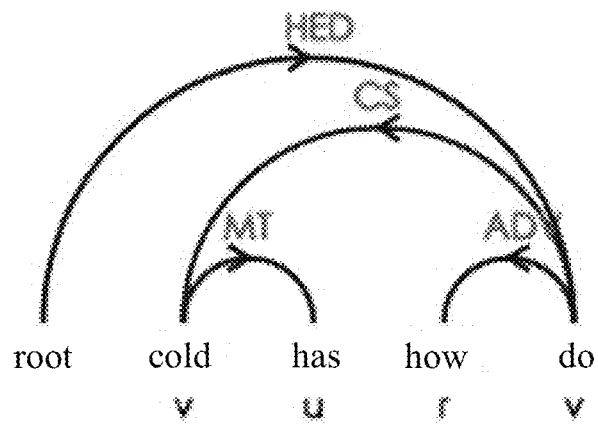
FIG. 2a is a schematic diagram of a dependency tree corresponding to sentence "How to do if has got a cold"
Figure 2B:
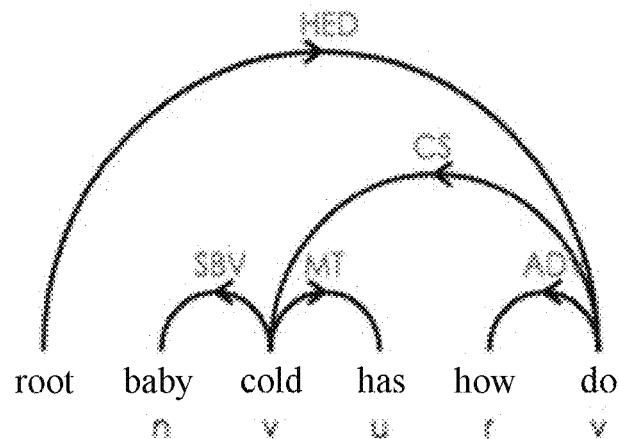
FIG. 2b is a schematic diagram of a dependency tree corresponding to sentence "How to do if the baby has got a cold"
Figure 2C:
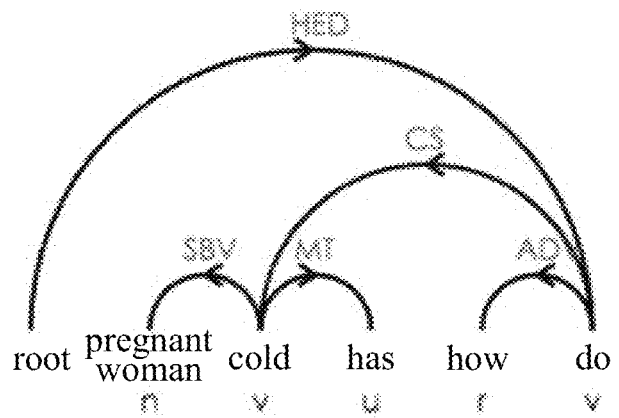
FIG. 2c is a schematic diagram of a dependency tree corresponding to sentence "How to do if a pregnant woman has got a cold"

For example, for the query sentence "How to do if has got a cold", part of speech of words in the query sentence is analyzed first. As shown in FIG. 2a, "cold" is a noun, which can be represented by a letter n, "has" is an auxiliary word, which can be represented by a letter u, "how" is a pronoun, which can be represented by a letter r, "do" is a verb, which can be represented by a letter v. And then, the dependency relationships between words are analyzed. "do", as a root, is represented by HED, the auxiliary word "has" connected with "cold", representing a voice structure of the query sentence, is represented by MT. "how" depends on "do", having an adverbial-verb structure relationship with "do", and is represented by AD. "cold" depends on "do", having a verb-object relationship with "do", and is represented by CS. Similarly, a dependency tree corresponding to "How to do if the baby has got a cold" is shown as FIG. 2b, in which, "baby" is noun, depending on "cold", having a subject-verbject relationship with "cold", and is represented by SBV. In the same way, a dependency tree corresponding to "How to do if a pregnant woman has got a cold" is shown as FIG. 2c, in which, "pregnant woman" is noun, depending on "cold", having a subject-verbject relationship with "cold", and is represented by SBV.

In block S104, the answer titles and/or the history query sentences are clustered according to the dependency trees, to generate at least one cluster of questions.

After the dependency trees corresponding to the answer titles and history query sentences are obtained, similarities between the dependency trees corresponding to the answer titles and the history query sentences are calculated according to nodes or dependency relationship pairs in the dependency trees. If a similarity is larger than a preset value (for example 80%), answer titles and history query sentences corresponding to the similarity are clustered to generate a cluster of questions.

For example, in history query sentences "How to do if the baby has got a cold" and "How to do if a pregnant woman has got a cold", both "baby" and "pregnant woman" depend on "cold", have a subject-verbject relationship with "cold", and are nouns. In addition, other parts of dependency trees corresponding to "How to do if the baby has got a cold" and "How to do if a pregnant woman has got a cold" are same. A similarity between the dependency trees corresponding to "How to do if the baby has got a cold" and "How to do if a pregnant woman has got a cold" is larger than 80%. If the preset value is 80%, the two history query sentences "How to do if the baby has got a cold" and "How to do if a pregnant woman has got a cold" can be aggregated together, i.e., clustered.

In addition, before the answer titles and the history query sentences are clustered, the dependency trees can be optimized. For example, branches corresponding to "has" and the like can be deleted from a dependency tree, to obtain a principal component tree of the sentence. And then, similarities between the principal component trees corresponding to the answer titles and the history query sentences are calculated, and the answer titles and the history query sentences are clustered according to the similarities between the principal component trees.

In an embodiment of the present disclosure, in order to improve search efficiency, after the principal component trees are obtained, similarities between the query sentence and the answer titles, or similarities between the query sentence and the history query sentences are calculated according to nodes and dependency relationship pairs in the principal component trees. For example, by calculating vector similarities of the nodes and the dependency relationship pairs in the principle component trees, answer titles and history query sentences having a low similarity with the query sentence can be filtered out, thus obtaining answer titles and history query sentences more similar to the query sentence.

After the answer titles and history query sentences more similar to the query sentence are obtained, similarities between principle component trees corresponding to the filtered answer titles and history query sentences are calculated. If a similarity is larger than a preset value, answer titles and history query sentences corresponding to the similarity are clustered.

In block S105, the at least one cluster of questions is generalized to generate candidate and clarified questions.

After the answer titles and the history query sentences are clustered to generate at least one cluster of questions, a core word of each of the at least one cluster of questions is obtained, and clarified words of the core word are generalized and re-aggregated using a hypernym and hyponym vocabulary and a word vector dictionary, to generate the candidate and clarified questions. The hypernym and hyponym vocabulary can be obtained with triple data, a preset structure mining, or manual annotation. The preset structure may include a structure of "is a". For example, "Old people is a high risk group for diabetes" is a structure of "is a", and thus it can be acquired that "old people" is a hyponymy of "group".

However, sometimes the hypernym and hyponym vocabulary may not cover all modifiers of a core word to be clarified. For example, a core word "cold" in the query sentence "How to do if has got a cold" may be modified by "anemofrigid" and "anemopyretic" in addition to groups such as "baby", "pregnant woman", "old people", but hyponymies of "group" does not cover "anemofrigid" and "anemopyretic".

In an embodiment of the present disclosure, for words that cannot be covered by the hypernym and hyponym vocabulary, the word vector dictionary can be used to generalize and re-aggregate the clarified words of the core word, to generate the candidate and clarified questions. The word vector dictionary is obtained by training a text deep representation model.

For example, for the query sentence "How to do if has got a clod", after clarified words of the core word "cold" are generalized and re-aggregated using the hypernym and hyponym vocabulary and the word vector dictionary, candidate and clarified questions generated may be "How to do if the baby has got a cold", "How to do if a pregnant woman has got a cold", or "How to do if a old man has got a cold", or may be "How to do with an anemofrigid cold" or "What to do with an anemopyretic cold", or the like.

For another example, for the query sentence "How to treat diabetes", after the core word "diabetes" is clarified, the candidate and clarified questions generated may be "How to treat diabetes of a pregnant woman" or "How to treat diabetes of teenagers", or may be "How to treat diabetes in early period" or "How to treat diabetes in terminal period". Clarifying dimensions corresponding to these candidate and clarified questions are "group" and "period". In addition, the candidate and clarified questions can be a combination of different clarifying dimensions, for example, "How to treat diabetes of a pregnant woman in early period", "How to treat diabetes of teenagers in early period", and the like.

In block S106, the candidate and clarified questions are displayed.

There may be a plurality of candidate and clarified questions generated. Therefore, in order to improve search efficiency, the candidate and clarified questions can be ranked according to respective appearance frequencies in the search logs and search results. Specifically, an appearance frequency of each of the candidate and clarified questions in search logs, i.e., a first frequency, is obtained, and an appearance frequency of each of the candidate and clarified questions in search results, i.e., a second frequency, is obtained. And then, the candidate and clarified questions are ranked according to the first frequency and the second frequency. Finally, the candidate and clarified questions are displayed according to a result of the ranking.

For example, for the candidate and clarified questions (for example, "How to do if a pregnant woman has got a cold", "How to do if the baby has got a cold", and "How to do if the old man has got a cold") of the query sentence (for example, "How to do if has got a cold") input by the user, the appearance appearances in the search logs of the user are 5, 6, 10 respectively. It can be seen that, the appearance frequency of "How to do if the old man has got a cold" is the highest. A rank result according to the appearance frequencies of the candidate and clarified questions in the search logs of the user is: "How to do if the old man has got a cold", "How to do if the baby has got a cold", "How to do if a pregnant woman has got a cold", and the ranked candidate and clarified questions are displayed to the user.

When displaying the candidate and clarified questions, all clarifying dimensions can be directly displayed, such that the user can select in each of the dimensions for a reasonable combination. FIG. 3 is a schematic diagram showing an effect of directly displaying a plurality of clarifying dimensions of a core word according to an embodiment of the present disclosure. As shown in FIG. 3, when a user input the query sentence "How to treat diabetes" in the search engine, two clarifying dimensions "group" and "period" are displayed under the input box of the search engine. Three options "old man", "pregnant woman", and "teenagers" are provided for the clarifying dimension "group", and two options "early period" and "terminal period" are provided for "period". Therefore, the user can select from the options of different dimensions according to query demand.

Figure 4:
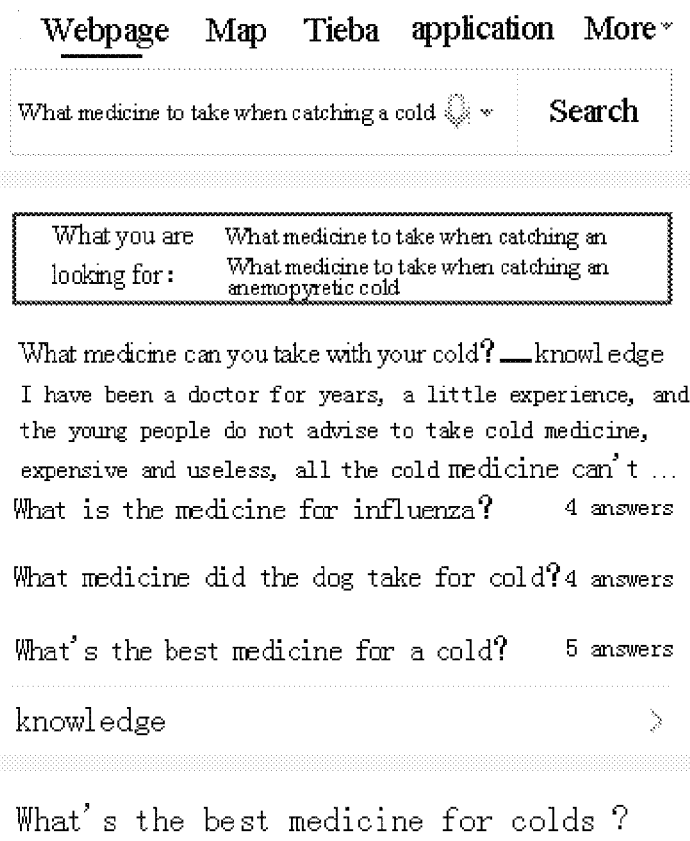
FIG. 4 is a first schematic diagram showing an effect of displaying one clarifying dimension of a core word each time according to an embodiment of the present disclosure.

In addition, one clarifying dimension can be provided to the user each time, such that the user can be guided to select a query sentence or an answer title that matches an exact query intension of the user. FIG. 4 is a first schematic diagram showing an effect of displaying one clarifying dimension of a core word each time according to an embodiment of the present disclosure. As shown in FIG. 4, when a user input a query sentence "What medicine to take when catching a cold" in the search engine, candidate and clarified questions ("What medicine to take when catching an anemofrigid cold" and "What medicine to take when catching an anemopyretic cold") corresponding to types of cold are provided under the input box by the search engine. After the user clicks "What medicine to take when catching an anemopyretic cold", the page jumps to a search result page of the query sentence. FIG. 5 is a second schematic diagram showing an effect of displaying one clarifying dimension of a core word each time according to an embodiment of the present disclosure. As shown in FIG. 5, four candidate and clarified questions (i.e., "What medicine to take when the baby catches an anemopyretic cold", "What medicine to take when a pregnant woman catches an anemopyretic cold", "What medicine to take when the old man catches an anemopyretic cold", and "What medicine to take when an adult catches an anemopyretic cold",) of a clarifying dimension "group" are further provided to the user, such that the query intension of the user can be further clarified.

It can be seen that, by guiding the user with candidate and clarified questions of different dimensions, the search intension of the user is clearer, such that the search results can satisfy demands of the users more exactly, avoiding viewing plentiful webpages for the user to find a search result, and improving search efficiency.

In conclusion, with the method for clarifying questions based on deep question and answer according to the embodiments of the present disclosure, by clustering and generalizing the recalled answer titles and history query sentences related to the query sentence, candidate and clarified questions are generated and displayed to the user, such that the user can obtain more exact search results according to the candidate and clarified questions, improving search efficiency.

Figure 6:
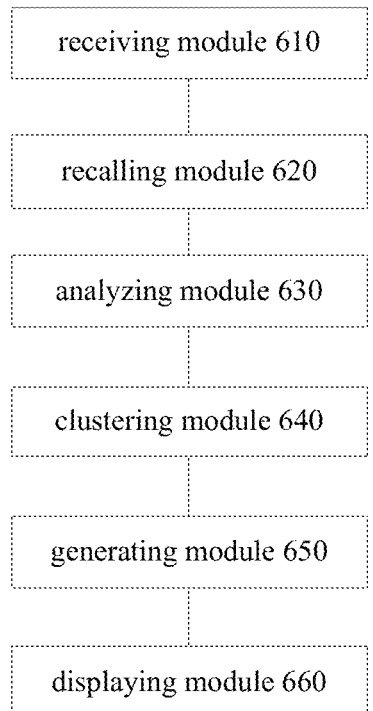
FIG. 6 is a block diagram of a device for clarifying questions based on deep question and answer according to an embodiment of the present disclosure.

A detailed description of a device for clarifying questions based on deep question and answer provided in embodiments of the present disclosure will be described in detail with reference to FIG. 6. FIG. 6 is a block diagram of a device for clarifying questions based on deep question and answer according to an embodiment of the present disclosure.

As shown in FIG. 6, the device for clarifying questions based on deep question and answer includes a receiving module 610, a recalling module 620, an analyzing module 630, a clustering module 640, a generating module 650, and a displaying module 660.

The receiving module 610 is configured to receive a query sentence.

For example, when a user wants to obtain a method for treating a cold, the user can input a query sentence "How to do if has got a cold" in an input box of a search engine. The receiving module 610 receives the query sentence input by the user, and searches according to the query sentence.

The recalling module 620 is configured to recall corresponding answer titles and/or history query sentences according to the query sentence.

The recalling module 620 is configured to search for corresponding answer titles in pages related to the query sentence using a search engine, and/or to obtain history query sentences related to the query sentence using an inverted index search.

After the query sentence input by the user is received, the recalling module 620 can search for corresponding answer titles in pages related to the query sentence using a search engine, or can obtain history query sentences related to the query sentence using an inverted index search, so as to recall the answer titles and history query sentences related to the query sentence from search logs or search results.

For example, the search engine can be used to recall answer titles related to the query sentence "How to do if has got a cold", such as "symptoms and treatments of a cold", "cure a cold quickly", and the like. Alternatively, the inverted index search can be used to obtain history query sentences related to the query sentence "How to do if has got a cold" from the search logs, such as "How to do if the baby has got a cold", "How to do if a pregnant woman has got a cold", "How to cure a cold quickly", "How to do if someone has got a cold", and the like.

The analyzing module 630 is configured to analyze the answer titles and/or the history query sentences to obtain corresponding dependency trees.

After the answer titles and the history query sentences are recalled according to the query sentence using the search engine or the inverted index search, the analyzing module 630 is configured to analyze part of speech of words and dependency relationships between the words in the query sentence, the answer titles and the history query sentences, to obtain corresponding dependency trees, such that the dependency relationships in the sentences can be represented by the dependency trees.

For example, for the query sentence "How to do if has got a cold", part of speech of words in the query sentence is analyzed first. As shown in FIG. 2a, "cold" is a noun, which can be represented by a letter n, "has" is an auxiliary word, which can be represented by a letter u, "how" is a pronoun, which can be represented by a letter r, "do" is a verb, which can be represented by a letter v. And then, the dependency relationships between words are analyzed. "do", as a root, is represented by HED, the auxiliary word "has" connected with "cold", representing a voice structure of the query sentence, is represented by MT. "how" depends on "do", having an adverbial-verb structure relationship with "do", and is represented by AD. "cold" depends on "do", having a verb-object relationship with "do", and is represented by CS. Similarly, a dependency tree corresponding to "How to do if the baby has got a cold" is shown as FIG. 2b, in which, "baby" is noun, depending on "cold", having a subject-verbject relationship with "cold", and is represented by SBV. In the same way, a dependency tree corresponding to "How to do if a pregnant woman has got a cold" is shown as FIG. 2c, in which, "pregnant woman" is noun, depending on "cold", having a subject-verbject relationship with "cold", and is represented by SBV.

The clustering module 640 is configured to cluster the answer titles and/or the history query sentences according to the dependency trees, to generate at least one cluster of questions.

The clustering module 640 is configured to calculate similarities between the dependency trees corresponding to the answer titles and the history query sentences, and to cluster answer titles and history query sentences corresponding to the similarity if a similarity is larger than a preset value.

After the dependency trees corresponding to the answer titles and history query sentences are obtained, similarities between the dependency trees corresponding to the answer titles and the history query sentences are calculated according to nodes or dependency relationship pairs in the dependency trees. If a similarity is larger than a preset value (for example 80%), answer titles and history query sentences corresponding to the similarity are clustered to generate a cluster of questions.

For example, in history query sentences "How to do if the baby has got a cold" and "How to do if a pregnant woman has got a cold", both "baby" and "pregnant woman" depend on "cold", have a subject-verbject relationship with "cold", and are nouns. In addition, other parts of dependency trees corresponding to "How to do if the baby has got a cold" and "How to do if a pregnant woman has got a cold" are same. A similarity between the dependency trees corresponding to "How to do if the baby has got a cold" and "How to do if a pregnant woman has got a cold" is larger than 80%. If the preset value is 80%, the two history query sentences "How to do if the baby has got a cold" and "How to do if a pregnant woman has got a cold" can be aggregated together, i.e. clustered.

Figure 7:
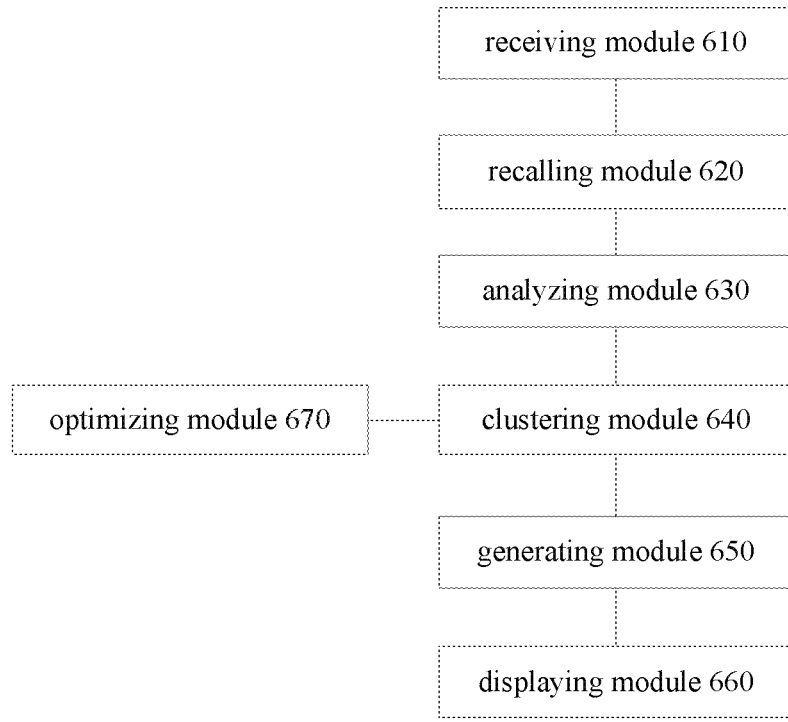
FIG. 7 is a block diagram of a device for clarifying questions based on deep question and answer according to another embodiment of the present disclosure.

In addition, as shown in FIG. 7, the device for clarifying questions based on deep question and answer further includes an optimizing module 670.

The optimizing module 670 is configured to optimize the dependency trees before the answer titles and/or the history query sentences are clustered according to the dependency trees to generate at least one cluster of questions.

Before the answer titles and the history query sentences are clustered, the optimizing module 670 can optimize the dependency trees. For example, branches corresponding to "has" and the like can be deleted from a dependency tree, to obtain a principal component tree of the sentence. And then, similarities between the principal component trees corresponding to the answer titles and the history query sentences are calculated, and the answer titles and the history query sentences are clustered according to the similarities between the principal component trees.

In an embodiment of the present disclosure, in order to improve search efficiency, after the principal component trees are obtained, similarities between the query sentence and the answer titles, or similarities between the query sentence and the history query sentences are calculated according to nodes and dependency relationship pairs in the principal component trees. For example, by calculating vector similarities of the nodes and the dependency relationship pairs in the principle component trees, answer titles and history query sentences having a low similarity with the query sentence can be filtered out, thus obtaining answer titles and history query sentences more similar to the query sentence.

After the answer titles and history query sentences more similar to the query sentence are obtained, similarities between principle component trees corresponding to the filtered answer titles and history query sentences are calculated. If a similarity is larger than a preset value, answer titles and/or history query sentences corresponding to the similarity are clustered.

The generating module 650 is configured to generalize the at least one cluster of questions to generate candidate and clarified questions.

The generating module 650 is configured to obtain a core word of each of the at least one cluster of questions, and to generalize and re-aggregate clarified words of the core word using a hypernym and hyponym vocabulary and a word vector dictionary, to generate the candidate and clarified questions.

The hypernym and hyponym vocabulary is obtained with triple data, a preset structure mining, and manual annotation. The word vector dictionary is obtained by training a text deep representation model.

After the answer titles and the history query sentences are clustered to generate at least one cluster of questions, the generating module 650 obtains a core word of each of the at least one cluster of questions, and generalizes and re-aggregates clarified words of the core word using the hypernym and hyponym vocabulary and the word vector dictionary, to generate the candidate and clarified questions. The hypernym and hyponym vocabulary can be obtained with triple data, a preset structure mining, or manual annotation. The preset structure may include a structure of "is a". For example, "Old people is a high risk group for diabetes" is a structure of "is a", and thus it can be acquired that "old people" is a hyponymy of "group".

However, sometimes the hypernym and hyponym vocabulary may not cover all modifiers of a core word to be clarified. For example, a core word "cold" in the query sentence "How to do if has got a cold" may be modified by "anemofrigid" and "anemopyretic" in addition to groups such as "baby", "pregnant woman", "old people", but hyponymies of "group" does not cover "anemofrigid" and "anemopyretic".

In an embodiment of the present disclosure, for words that cannot be covered by the hypernym and hyponym vocabulary, the word vector dictionary can be used to generalize and re-aggregate the clarified words of the core word, to generate the candidate and clarified questions. The word vector dictionary is obtained by training a text deep representation model.

For example, for the query sentence "How to do if has got a clod", after clarified words of the core word "cold" are generalized and re-aggregated using the hypernym and hyponym vocabulary and the word vector dictionary, candidate and clarified questions generated may be "How to do if the baby has got a cold", "How to do if a pregnant woman has got a cold", or "How to do if a old man has got a cold", or may be "How to do with an anemofrigid cold" or "How to do with an anemopyretic cold", or the like.

For another example, for the query sentence "How to treat diabetes", after the core word "diabetes" is clarified, candidate and clarified questions generated may be "How to treat diabetes of a pregnant woman" or "How to treat diabetes of teenagers", or may be "How to treat diabetes in early period" or "How to treat diabetes in terminal period". Clarifying dimensions corresponding to these candidate clarified questions are "group" and "period". In addition, the candidate and clarified questions can be a combination of different clarifying dimensions, for example, "How to treat diabetes of a pregnant woman in early period", "How to treat diabetes of teenagers in early period", and the like.

The displaying module 660 is configured to display the candidate and clarified questions.

The displaying module 660 is configured to obtain a first frequency of each of the candidate and clarified questions in search logs and a second frequency of each of the candidate and clarified questions in search results, to rank the candidate and clarified questions according to the first frequency and the second frequency, and to display the candidate and clarified questions according to a result of the ranking.

There may be a plurality of candidate and clarified questions generated. Therefore, in order to improve search efficiency, the candidate and clarified questions can be ranked according to respective appearance frequencies in the search logs and search results. Specifically, an appearance frequency of each of the candidate and clarified questions in search logs, i.e., a first frequency, is obtained, and an appearance frequency of each of the candidate and clarified questions in search results, i.e., a second frequency, is obtained. And then, the candidate and clarified questions are ranked according to the first frequency and the second frequency. Finally, the candidate and clarified questions are displayed according to a result of the ranking.

For example, for the candidate and clarified questions (for example, "How to do if a pregnant woman has got a cold", "How to do if the baby has got a cold", and "How to do if the old man has got a cold") of the query sentence (for example, "How to do if has got a cold") input by the user, the appearance appearances in the search logs of the user are 5, 6, 10 respectively. It can be seen that, the appearance frequency of "How to do if the old man has got a cold" is the highest. A rank result according to the appearance frequencies of the candidate and clarified questions in the search logs of the user is: "How to do if the old man has got a cold", "How to do if the baby has got a cold", "How to do if a pregnant woman has got a cold", and the ranked candidate and clarified questions are displayed to the user.

When displaying the candidate and clarified questions, all clarifying dimensions can be directly displayed, such that the user can select each of the dimensions for a reasonable combination. FIG. 3 is a schematic diagram showing an effect of directly displaying a plurality of clarifying dimensions of a core word according to an embodiment of the present disclosure. As shown in FIG. 3, when a user input the query sentence "How to treat diabetes" in the search engine, two clarifying dimensions "group" and "period" are displayed under the input box of the search engine. Three options "old man", "pregnant woman", and "teenagers" are provided for the clarifying dimension "group", and two options "early period" and "terminal period" are provided for "period". Therefore, the user can select from the options of different dimensions according to query demand.

In addition, one clarifying dimension can be provided to the user each time, such that the user can be guided to select a query sentence or an answer title that matches an exact query intension of the user. FIG. 4 is a first schematic diagram showing an effect of displaying one clarifying dimension of a core word each time according to an embodiment of the present disclosure. As shown in FIG. 4, when a user input a query sentence "What medicine to take when catching a cold" in the search engine, candidate and clarified questions ("What medicine to take when catching an anemofrigid cold" and "What medicine to take when catching an anemopyretic cold") corresponding to types of cold are provided under the input box by the search engine. After the user clicks "What medicine to take when catching an anemopyretic cold", the page jumps to a search result page of the query sentence. FIG. 5 is a second schematic diagram showing an effect of displaying one clarifying dimension of a core word each time according to an embodiment of the present disclosure. As shown in FIG. 5, four candidate clarified questions (i.e., "What medicine to take when the baby catches an anemopyretic cold", "What medicine to take when a pregnant woman catches an anemopyretic cold", "What medicine to take when the old man catches an anemopyretic cold", and "What medicine to take when an adult catches an anemopyretic cold",) of a clarifying dimension "group" are further provided to the user, such that the query intension of the user can be further clarified.

It can be seen that, by guiding the user with candidate and clarified questions of different dimensions, the search intension of the user is clearer, such that the search results can satisfy demands of the users more exactly, avoiding viewing plentiful webpages for the user to find a search result, and improving search efficiency.

It should be noted that, the explanation in above embodiments of the method for clarifying questions based on deep question and answer is also applicable to the embodiments of the device for clarifying questions based on deep question and answer in this embodiment, with similar implementation principle, which is not described here.

In conclusion, with the device for clarifying questions based on deep question and answer according to embodiments of the present disclosure, by clustering and generalizing the recalled answer titles and history query sentences related to the query sentence, candidate and clarified questions are generated and displayed to the user, such that the user can obtain more exact search results according to the candidate clarified question-and-answers, improving search efficiency.

In order to realize the above embodiments, the present disclosure also provides a terminal including one or more processors and a memory configured to store instructions executable by the one or more processors. The one or more processors is configured to execute following steps: receiving a query sentence; recalling corresponding answer titles and/or history query sentences according to the query sentence; analyzing the answer titles and/or the history query sentences to obtain corresponding dependency trees; clustering the answer titles and/or the history query sentences according to the dependency trees, to generate at least one cluster of questions; generalizing the at least one cluster of questions to generate candidate and clarified questions; and displaying the candidate clarified questions.

It should be noted that, the explanation in above embodiments of the method for clarifying questions based on deep question and answer is also applicable to the embodiments of the terminal in this embodiment, with similar implementation principle, which is not described here.

With the terminal according to embodiments of the present disclosure, by clustering and generalizing the recalled answer titles and history query sentences related to the query sentence, candidate and clarified questions are generated and displayed to the user, such that the user can obtain more exact search results according to the candidate and clarified questions, improving search efficiency.

In order to realize the above embodiments, the present disclosure also provides a non-transitory computer-readable storage medium, configured to store one or more programs. When the one or more programs are executed by a processor of a mobile terminal, the mobile terminal is caused to execute a method for clarifying questions based on deep question and answer according to the embodiments of the first aspect of the present disclosure.

With the non-transitory computer-readable storage medium according to embodiments of the present disclosure, by clustering and generalizing the recalled answer titles and history query sentences related to the query sentence, candidate and clarified questions are generated and displayed to the user, such that the user can obtain more exact search results according to the candidate and clarified questions, improving search efficiency.

In order to realize the above embodiments, the present disclosure also provides a program product. When instructions in the program product are executed by a processor, the processor is configured to execute a method for clarifying questions based on deep question and answer.

With the program product according to embodiments of the present disclosure, by clustering and generalizing the recalled answer titles and history query sentences related to the query sentence, candidate and clarified questions are generated and displayed to the user, such that the user can obtain more exact search results according to the candidate clarified questions, improving search efficiency.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for clarifying questions based on deep question and answer, comprising:
   receiving a query sentence;
   recalling corresponding answer titles and/or history query sentences according to the query sentence;
   analyzing part of speech of words and dependency relationships between the words in the query sentence and the answer titles and/or the history query sentences to obtain corresponding dependency trees, such that the dependency relationships in the sentences are represented by the dependency trees;
   clustering the answer titles and/or the history query sentences according to nodes or dependency relationship pairs in the dependency trees, to generate at least one cluster of questions;
   generalizing the at least one cluster of questions to generate candidate and clarified questions; and
   displaying the candidate and clarified questions.

2. The method according to claim 1, wherein recalling corresponding answer titles and/or history query sentences according to the query sentence comprises:
   with a search engine, searching for corresponding answer titles in pages related to the query sentence; and/or
   obtaining history query sentences related to the query sentence by using an inverted index search.

3. The method according to claim 1, wherein clustering the answer titles and/or the history query sentences according to the dependency trees, to generate at least one cluster of questions comprises:
   calculating similarities between the dependency trees corresponding to the answer titles and/or the history query sentences;
   if a similarity is larger than a preset value, clustering answer titles and/or history query sentences corresponding to the similarity.

4. The method according to claim 3, before clustering the answer titles and/or the history query sentences according to the dependency trees to generate at least one cluster of questions, further comprising:
   optimizing the dependency trees.

5. The method according to claim 1, wherein generalizing the at least one cluster of questions to generate candidate and clarified questions comprises:
   obtaining a core word of each of the at least one cluster of questions;
   generalizing and re-aggregating clarified words of the core word by using a hypernym and hyponym vocabulary and a word vector dictionary, to generate the candidate and clarified questions.

6. The method according to claim 5, wherein the hypernym and hyponym vocabulary is obtained with triple data, a preset structure mining, and manual annotation.

7. The method according to claim 5, wherein the word vector dictionary is obtained by training a text deep representation model.

8. The method according to claim 1, wherein displaying the candidate and clarified questions comprises:
   for each of the candidate and clarified questions, obtaining a first frequency in search logs and a second frequency in search results;
   ranking the candidate and clarified questions according to the first frequency and the second frequency;
   displaying the candidate and clarified questions according to a result of the ranking.

9. A device for clarifying questions based on deep question and answer, comprising:
   one or more processors;
   a memory, configured to store one or more software modules executable by the one or more processors,
   wherein the one or more software modules comprise:
      a receiving module, configured to receive a query sentence;
      a recalling module, configured to recall corresponding answer titles and/or history query sentences according to the query sentence;
      an analyzing module, configured to analyze part of speech of words and dependency relationships between the words in the query sentence and the answer titles and/or the history query sentences to obtain corresponding dependency trees, such that the dependency relationships in the sentences are represented by the dependency trees;
      a clustering module, configured to cluster the answer titles and/or the history query sentences according to nodes or dependency relationship pairs in the dependency trees, to generate at least one cluster of questions;
      a generating module, configured to generalize the at least one cluster of questions to generate candidate and clarified questions; and
      a displaying module, configured to display the candidate and clarified questions.

10. The device according to claim 9, wherein the recalling module is configured to:
  search for corresponding answer titles in pages related to the query sentence using a search engine; and/or
  obtain history query sentences related to the query sentence using an inverted index search.

11. The device according to claim 9, wherein the clustering module is configured to:
  calculate similarities between the dependency trees corresponding to the answer titles and/or the history query sentences;
  if a similarity is larger than a preset value, cluster answer titles and/or history query sentences corresponding to the similarity.

12. The device according to claim 11, wherein the one or more software modules further comprise:
  an optimizing module, configured to optimize the dependency trees before the answer titles and/or the history query sentences are clustered according to the dependency trees to generate at least one cluster of questions.

13. The device according to claim 9, wherein the generating module is configured to:
  obtain a core word of each of the at least one cluster of questions;
  generalize and re-aggregate clarified words of the core word using a hypernym and hyponym vocabulary and a word vector dictionary, to generate the candidate and clarified questions.

14. The device according to claim 13, wherein the hypernym and hyponym vocabulary is obtained with triple data, a preset structure mining, or manual annotation.

15. The device according to claim 13, wherein the word vector dictionary is obtained by training a text deep representation model.

16. The device according to claim 9, wherein the displaying module is configured to:
  obtain a first frequency in search logs and a second frequency in search results for each of the candidate and clarified questions;
  rank the candidate and clarified questions according to the first frequency and the second frequency;
  display the candidate and clarified questions according to a result of the ranking.

17. A non-transitory computer-readable storage medium, configured to store one or more programs that, when executed by a processor of a terminal, cause the terminal to perform a method for clarifying questions based on deep question and answer, the method comprising:
  receiving a query sentence;
  recalling corresponding answer titles and/or history query sentences according to the query sentence;
  analyzing part of speech of words and dependency relationships between the words in the query sentence and the answer titles and/or the history query sentences to obtain corresponding dependency trees, such that the dependency relationships in the sentences are represented by the dependency trees;
  clustering the answer titles and/or the history query sentences according to nodes or dependency relationship pairs in the dependency trees, to generate at least one cluster of questions;
  generalizing the at least one cluster of questions to generate candidate and clarified questions; and
  displaying the candidate and clarified questions.

* * * * *